United States Patent
Wachenfeld et al.

(10) Patent No.: US 9,369,062 B2
(45) Date of Patent: Jun. 14, 2016

(54) SINGLE-PHASE EMERGENCY OPERATION OF A THREE-PHASE INVERTER AND CORRESPONDING INVERTER HAVING A POLYPHASE TO SINGLE PHASE CHANGEOVER OPERATION

(71) Applicant: SMA Solar Technology AG, Niestetal (DE)

(72) Inventors: Volker Wachenfeld, Hofgeismar (DE); Claus Allert, Kaufungen (DE); Christian Gehrke, Kassel (DE); Tobias Mueller, Niestetal (DE); Pablo Ignacio Correa Vasquez, Bad Neustadt an der Saale (DE); Florian Steiper, Kassel (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 0 days.

(21) Appl. No.: 14/660,346

(22) Filed: Mar. 17, 2015

(65) Prior Publication Data

US 2015/0280607 A1 Oct. 1, 2015

(30) Foreign Application Priority Data

Mar. 26, 2014 (DE) .......................... 10 2014 104 216

(51) Int. Cl.
*H02J 3/38* (2006.01)
*H02M 7/42* (2006.01)
(Continued)

(52) U.S. Cl.
CPC ................. *H02M 7/42* (2013.01); *H02J 9/062* (2013.01); *H02M 7/48* (2013.01); *H02J 3/383* (2013.01); *H02M 7/487* (2013.01); *Y02B 10/72* (2013.01)

(58) Field of Classification Search
CPC ..... H02J 2003/388; H02J 3/383; H02J 3/005; Y02B 70/346; H02M 7/487
See application file for complete search history.

(56) References Cited

U.S. PATENT DOCUMENTS

| | | | |
|---|---|---|---|
| 7,427,815 B1 * | 9/2008 | Ye .......................... | G01R 31/043 307/127 |
| 2003/0165036 A1 * | 9/2003 | Tuladhar ................... | H02J 3/38 361/62 |

(Continued)

FOREIGN PATENT DOCUMENTS

| | | |
|---|---|---|
| DE | 19937410 A1 | 2/2001 |
| DE | 102005008809 A1 | 10/2006 |

(Continued)

OTHER PUBLICATIONS

Prasenjit Basak, S. Chowdhury, S. Halder nee Dey, S.P. Chowdhury, A literature review on integration of distributed energy resources in the perspective of control, protection and stability of microgrid, Renewable and Sustainable Energy Reviews, vol. 16, Issue 8, Oct. 2012, pp. 5545-5556, ISSN 1364-0321, http://dx.doi.org/10.1016/j.rser.2012.*

(Continued)

*Primary Examiner* — Harry Behm
*Assistant Examiner* — Peter Novak
(74) *Attorney, Agent, or Firm* — Eschweiler & Associates, LLC (57) ABSTRACT

A method for converting DC power from a source into AC power by means of an inverter which includes three bridge branches, each having a phase output, is described. During grid-connected operation, the bridge branches are actuated in such a way that the AC power is fed, as three-phase grid-compliant power, into a grid. During emergency operation of the inverter, the AC power is provided as single-phase island grid by two of the three bridge branches at the phase outputs thereof, wherein the inverter is disconnected from the grid.

13 Claims, 5 Drawing Sheets

(51) Int. Cl.
*H02M 7/48* (2007.01)
*H02J 9/06* (2006.01)
*H02M 7/487* (2007.01)

(56) References Cited

U.S. PATENT DOCUMENTS

2005/0018460 A1 1/2005 Chen et al.
2011/0267857 A1 11/2011 Fornage
2013/0155736 A1 6/2013 Ilic et al.

FOREIGN PATENT DOCUMENTS

EP 1226996 A2 7/2002
EP 1286455 A1 2/2003
EP 1443634 A2 8/2004

OTHER PUBLICATIONS

English translation of a German Office Action dated Dec. 2, 2014 for copending German Application No. 10 2014 104 216.6.

\* cited by examiner

SINGLE-PHASE EMERGENCY OPERATION OF A THREE-PHASE INVERTER AND CORRESPONDING INVERTER HAVING A POLYPHASE TO SINGLE PHASE CHANGEOVER OPERATION

REFERENCE TO RELATED APPLICATION

This application claims priority to German Application number 10 2014 104 216.6 filed on Mar. 26, 2014.

FIELD

The disclosure relates to a method for operating an inverter, in particular a photovoltaic inverter, in order to provide a single-phase AC power for supplying consumers during an emergency operation, and to an inverter which provides a single-phase AC power for supplying consumers by means of the method during an emergency operation.

BACKGROUND

Inverters for converting the electric power from a DC source, referred to here as DC (direct current) power into alternating current or an associated power, referred to here as AC (alternating current) power, as is required by the majority of consumers for operation thereof, have long been known. A source of DC power may be a battery, a photovoltaic generator or the like.

Usually inverters for converting DC power of photovoltaic generators, referred to here as photovoltaic inverters, feed into a relatively large grid. Consumers for domestic use, industrial operation or the like are connected to this grid and require different voltages for their operation, depending on their power consumption.

Operators of decentralized energy sources, for example house owners or proprietors of an industrial company, which generate energy locally, on the premises of their house or industrial company, usually feed this energy into the grid during grid-connected operation. In the case of grid failure the operators of decentralized energy sources wish to continue the operation of at least the important consumers. Often the power output of the local energy sources is only sufficient for operating some of the consumers.

In order to supply consumers in the event of a grid failure, so-called backup systems or "uninterruptable power supplies" are known, with reference being made here by way of example to DE 10 2011 000 394 A1. In this case, a battery and a further inverter are usually connected to the local grid of the house or of the industrial plant in order to produce a local island grid. After grid failure the local grid is disconnected from the grid and then the further inverter is operated to cover a basic load with the energy stored in the battery. This means that some consumers can be safely supplied with power using the stored energy. At the same time, the local grid enables the photovoltaic inverters to feed into a grid again without the photovoltaic inverters needing to adapt their regulation to the island situation.

SUMMARY

There still is a need for ensuring the local supply of energy to consumers in case of a grid failure, but without additional inverters and batteries needing to be provided.

It is therefore object of the present disclosure to disclose an improved method for supplying energy to consumers in the event of grid failure, and an inverter configured this method.

This object is achieved by a method and by an inverter according to the claims. Developments and advantageous embodiments are specified in the dependent claims.

A method according to the disclosure is configured for converting DC power from a source into AC power by means of an inverter comprising three bridge branches, each having a phase output. In one embodiment the DC power is provided by a photovoltaic generator. During grid-connected operation, the bridge branches are actuated in a way that AC power is fed, as three-phase grid-compliant power, into a grid. Three-phase in this case is used to refer to systems which operate with three alternating currents or AC voltages of the same frequency with phase angles shifted with respect to one another through 120°. Wherein, in these systems, which are also known as "AC systems", the neutral point does not need to be grounded. Grid-compliant conditions is intended to mean that the conditions of the grid operator (grid code) are met at the feed-in point.

If the inverter is disconnected from the grid, for example because the grid has a disturbance, a fault or is disconnected, emergency operation is provided. By operation of two of the three inverter bridge branches, AC power is provided, as a single-phase island grid, at two of the three phase outputs. This operation is also referred to here as island-operation. During this island-operation, a single-phase island grid is provided by the inverter, which means that the voltage magnitude and frequency are now preset by the inverter. Thus, power can be supplied to single-phase consumers.

Advantageously, a single-phase island grid is provided without further components or devices being required only by operating some of the inverter bridge branches provided in the inverter.

In an advantageous embodiment of the method according to the disclosure, during grid-connected operation, the three bridge branches of the inverter are actuated in a first clocking method. During island-operation, two of the three inverter bridge branches are actuated in a second clocking method, wherein the first and the second clocking methods are different. Thus, using the same inverter bridge, consisting of three bridge branches, a three-phase AC power is fed in during grid-connected operation, while a single-phase AC power is provided during island-operation for supplying power to consumers, merely by means of different clocking methods.

In a further advantageous embodiment of the method according to the disclosure, a peak voltage between the two phase outputs at which the single-phase island grid is provided during island-operation is different from a peak voltage between the same two phase outputs during grid-connected operation. The peak voltage is generally understood to mean the maximum value of an AC voltage. The reference variable for the connection of consumers to an AC voltage grid is usually the rms value of the voltage (root mean square); rms values and the peak voltage can be converted into one another in a known manner by means of a factor.

In many countries, the voltage between two phase outputs during three-phase operation is different from the voltage required by single-phase consumers. Thus, consumers with high power consumption often require a three-phase AC connection, whereas low-rating consumers which are customary in domestic use are operated using a single-phase connection.

In a further advantageous embodiment of the method according to the disclosure, the first clocking method is an N-level clocking method, wherein N>2, and the second clocking method is a two-level clocking method. Owing to their greater level of efficiency, multilevel topologies which are operated using corresponding multilevel clocking methods are often used particularly in three-phase systems. During island-operation, some of the switches are not clocked and there is a change to a two-level clocking method.

In another advantageous embodiment of the method according to the disclosure, during island-operation, the single-phase AC power is provided at the same connection point for consumers as during grid-connected operation. Once the disconnection from the grid has taken place, the phase outputs may be switched onto the feedlines of the consumers locally so that the consumers do not need to be relocated to a specific socket outlet. They remain in position and are supplied power by the same feedline of the domestic installation.

In one variant of the method according to the disclosure, during island-operation, the two phase outputs which provide the single-phase AC power are switched to a different output. This may be necessary if connection conditions set by supervisory authorities do not permit switchover of the feedlines, as mentioned above. In Japan a supply which is separate from the rest of the grid is required during island-operation so the single-phase AC power should be switched at a different output, for example one that is separate from the rest of the domestic installation. In this way, no changes to the existing domestic installation are required.

In a further embodiment of the method according to the disclosure, during island-operation, one of the phase outputs is connected to the ground potential. In many countries, single-phase consumers are operated between a phase and a grounded neutral conductor. In order to provide a three-phase AC power, a connection to a neutral conductor is not necessary. If a single-phase AC power with a reference to the neutral conductor shall be provided during island-operation it may be necessary to switch a connection from one of the phase outputs to the ground potential.

An inverter according to the disclosure converts DC power from a source into AC power. The inverter comprises three bridge branches, each having a phase output. A DC link is arranged between the source of the DC power and the bridge branches and includes one or more capacitors, for example, and is capable of storing energy. The DC link potential is floating with respect to ground potential, which means in particular that the DC link is not grounded. Thus, the inverter according to the disclosure does not require a neutral conductor connection for the three-phase operation.

During grid-connected operation, the bridge branches are actuated in such a way that AC power is fed, as three-phase grid-compliant power, into a grid. During island-operation, i.e. when the inverter is disconnected from the grid, the AC power is provided by two of the three bridge branches as a single-phase island grid. An inverter according to the disclosure may be a photovoltaic inverter which converts DC power of a photovoltaic generator at its input into AC power at its output.

The floating DC link potential results in advantages with respect to efficiency during operation of the inverter since the inverter can be operated on a lower DC link voltage during three-phase operation than in the case of a grounded DC link. The DC link voltage may correspond to the maximum potential difference between the three phases, and the DC link potential, based on the centre point of the three-phase grid voltage, oscillates at 3 times the grid frequency, also referred to as "floating average voltage".

In accordance with an advantageous embodiment of the inverter according to the disclosure, the peak voltage between the two phase outputs at which a single-phase island grid is provided during island-operation is different from the peak voltage between the same two phase outputs during grid-connected operation. Since in particular photovoltaic generators have a severely fluctuating power output which is weather-dependent, it may be advantageous to provide only the most important consumers and in particular consumers with a power consumption which is not too high for island-operation. Such consumers are usually operated on a single phase and can continue to be operated in the event of a failure of the grid using the inverter according to the disclosure.

In accordance with a further advantageous embodiment of the inverter according to the disclosure, the bridge branches are constructed from at least two semiconductor switches. Thus, an inverter according to the disclosure could be constructed using the so-called B6 topology. Preferably, known three-level or multilevel topologies such as "Neutral Point Clamped" (NPC), "Bipolar Switch Neutral Point Clamped" (BSNPC), "Active Neutral Point Clamped" (ANPC) or "Flying Capacitor" (FLC) are used, which require substantially more semiconductor switches, but often have advantages in respect of their efficiency.

During island-operation, the AC power can be provided by operation of two switches in each of the two bridge branches which are used during island-operation. The remaining switches may be opened, but at least they are not clocked, in order to form the single-phase AC power. Thus, for example, two switches may be clocked in two of the three bridge branches as in the so-called H4 bridge.

In one variant of the inverter according to the disclosure, during island-operation, the single-phase AC power is provided to the same connection point for consumers to which the consumers are also connected during grid-connected operation. Thus, the consumers may be operated using the same socket outlet, for example, as during grid-connected operation. For this purpose, the inverter has a switching device for providing a connection between the two of the three bridge branches at which the single-phase AC power is provided during island-operation and a connection point for consumers. Once the disconnection from the grid has taken place, the phase outputs of a local grid may be connected onto the feedlines of the consumers so that the consumers do not need to be relocated to a specific socket outlet. They remain in position and are supplied with power by the same feedline of the domestic installation.

In accordance with a further advantageous embodiment of the inverter according to the disclosure, a switchover of the single-phase AC power during island-operation to another connection point for the consumers which is separated from the rest of the local grid takes place. This may be necessary if conditions set by supervisory authorities do not permit switchover of the feedlines or if, as in Japan, a supply which is separate from the rest of the grid is required during island-operation. In this case the single-phase AC power may also be connected to another output, for example a socket outlet provided in a separate housing. In this way, no changes to the existing domestic installation are required, and the separate socket outlet may be connected to the inverter via a cable and activated automatically or manually as required.

BRIEF DESCRIPTION OF THE DRAWINGS

The disclosure will be explained in more detail below with reference to exemplary embodiments with the aid of figures, in which.

DETAILED DESCRIPTION

Figure 1:
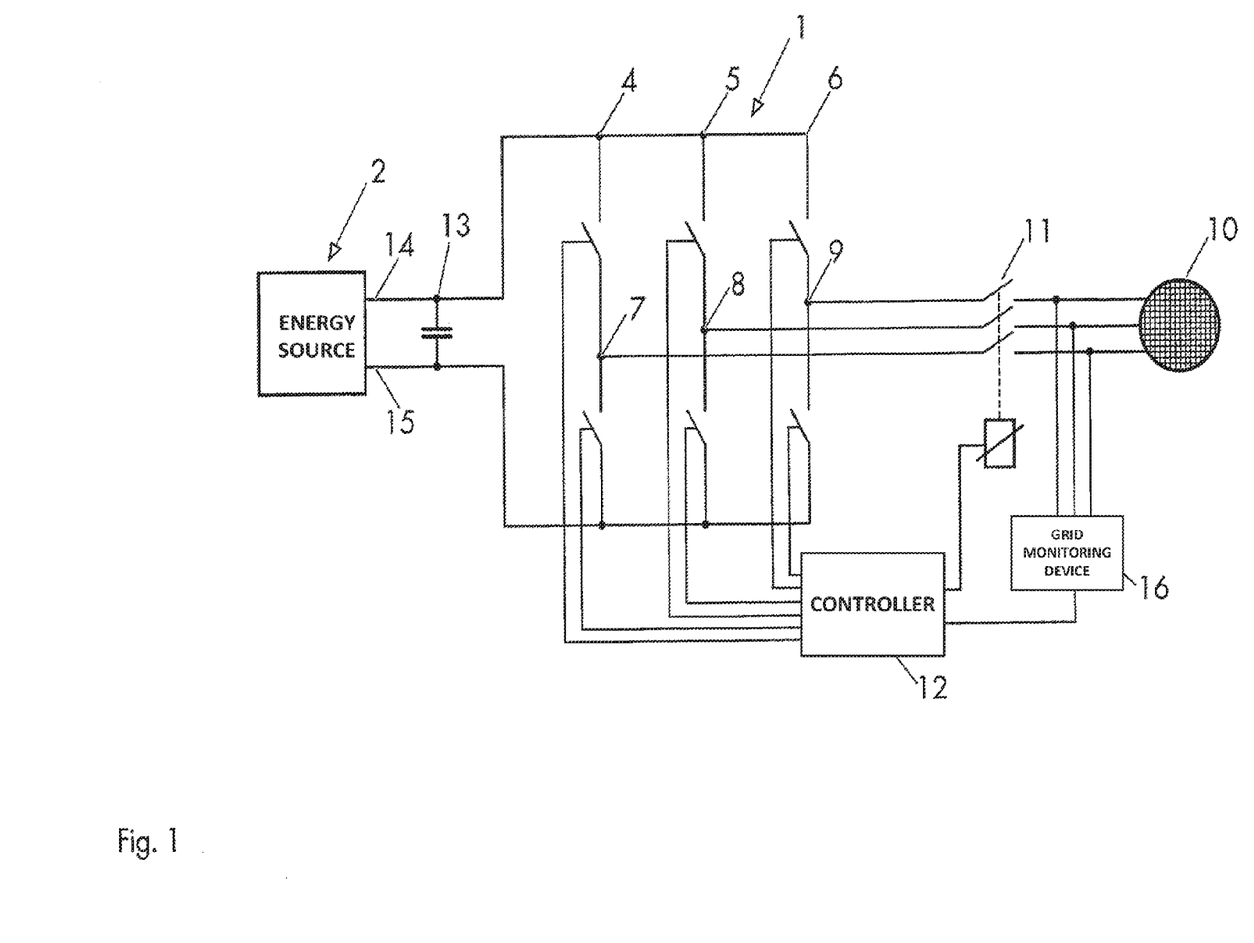
FIG. 1 shows, as a first exemplary embodiment according to the disclosure, an inverter having a B6 topology.

FIG. 1 shows, as first example embodiment, an inverter 1 having three bridge branches 4, 5, 6 which is suitable for implementing the method according to the disclosure. The bridge branches 4, 5, 6 each including two series-connected switches. In general these switches are semiconductor switches, for example IGBTs. This switch arrangement is also referred to as a B6 topology. During grid-connected operation, i.e. when the disconnecting switch 11 is closed, the two switches in the bridge branches 4, 5, 6 are operated in clocked fashion by a controller 12 such that a grid-compliant power is fed into a grid 10 at the phase outputs 7, 8, 9, which are located between the two switches in the respective bridge branches 4, 5, 6. Energy is provided by a source 2, which can produce a DC power, such as a battery or a photovoltaic generator, for example. If this is a rechargeable battery, energy can be stored and output; in this case the inverter 1 is configured for bidirectional operation. The DC power provided by the source 2 is buffered by a DC link 13.

The grid 10 is assumed to be a three-phase grid; therefore, the inverter 1 outputs a three-phase AC power at the three phase outputs 7, 8, 9, the magnitude and frequency of the AC power being preset by the grid 10. The grid 10 may in this case have a grounded neutral point, but may also be ungrounded. The inverter 1 is ungrounded, i.e. it does not have a connection to the ground potential, in particular it does not have a 4-conductor topology and does not have a DC link center point which is passed to the outside as a connection to a neutral conductor.

A grid monitoring device 16 monitors the state of the grid 10 by measuring voltage, frequency and/or phase angle of the grid 10 and comparing with normative presets or presets set by a grid operator. In this way, a failure of the grid 10 can be detected and may be communicated to the controller 12 by a wireless or wired communications link. If a failure of the grid 10 is detected, the inverter 1 may be disconnected from the grid 10 by means of the disconnecting switch 11. This may take place automatically, for example triggered by the controller 12, or manually. Once the inverter 1 has been disconnected from the grid 10, in accordance with the disclosure a single-phase island grid is provided at two of the three phase outputs 7, 8, 9, for example at the phase outputs 7 and 8. For this purpose, the voltage and frequency of the single-phase energy supply are preset by the inverter 1.

Since most of the consumers which are customary in domestic use can be operated on a single-phase voltage, energy can be supplied to those consumers during failure of the grid 10. For this purpose, they need to be connected to the phase outputs to which AC power is supplied during emergency operation, in this example embodiment to the phase outputs 7 and 8.

In many grids, energy is supplied to single-phase consumers by connecting to one phase and to ground potential. The grid itself is often an AC grid, which operates using three alternating currents or AC voltages of the same frequency, the phase angles of which are shifted through 120° with respect to one another. The voltages between two phases, for example 360 $V_{rms}$, are then usually much greater than the voltage from one phase to ground, for example 220 $V_{rms}$. For this reason consumers with a greater power consumption are usually connected to all three phases. These consumers cannot be operated by use of the method according to the disclosure during emergency operation.

In general the voltage magnitude and the phase angle between the phase outputs 7, 8 at which the single-phase AC power is provided during island-operation need to be converted at the beginning of emergency operation. For this purpose, the clocking pattern according to which the switches in the bridge branches 4, 5, 6 are actuated needs to be changed.

Figure 2A:
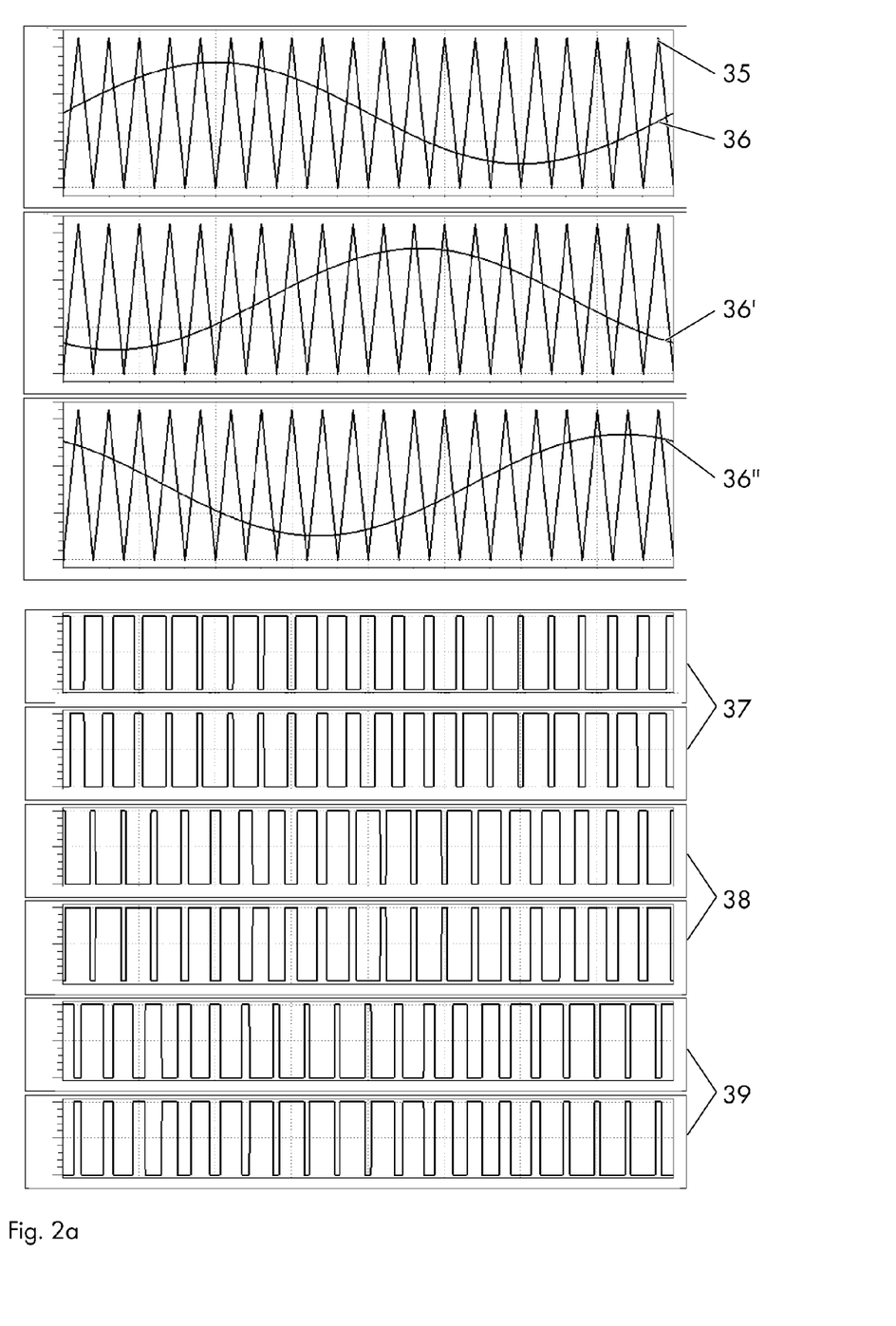
FIGS. 2a and 2b show embodiments of the clocking methods for actuating the switches in the bridge branches according to the disclosure.

FIG. 2a shows a possible embodiment of a clocking method for actuating the switches of the inverter 1 during grid-connected operation. If the inverter 1 is constructed as shown in FIG. 1 PWM signals for actuating the switches in the bridge branches 4, 5, 6 may be generated in a known manner by a controller 12. A reference signal 36 is compared with a carrier signal 35. The three graphs at the top are assigned to the three phase outputs 7, 8, 9. They represent the respective input variables for the controller 12, wherein the reference signals 36, 36', 36" depict the form of the desired output voltage. It can be seen that the three reference signals 36, 36', 36" are phase-shifted through 120° with respect to one another. This results in an output of a three-phase power at the three phase outputs 7, 8, 9 of the inverter 1. The controller 12 generates PWM signals 37, 38, 39 for the bridge branches 4, 5, 6 from the comparison between the respective reference signal 36 and carrier signal 35, which is identical for all phases, wherein the PWM signals 37 may represent the actuation of the two switches in the bridge branch 4, for example.

Figure 2B:
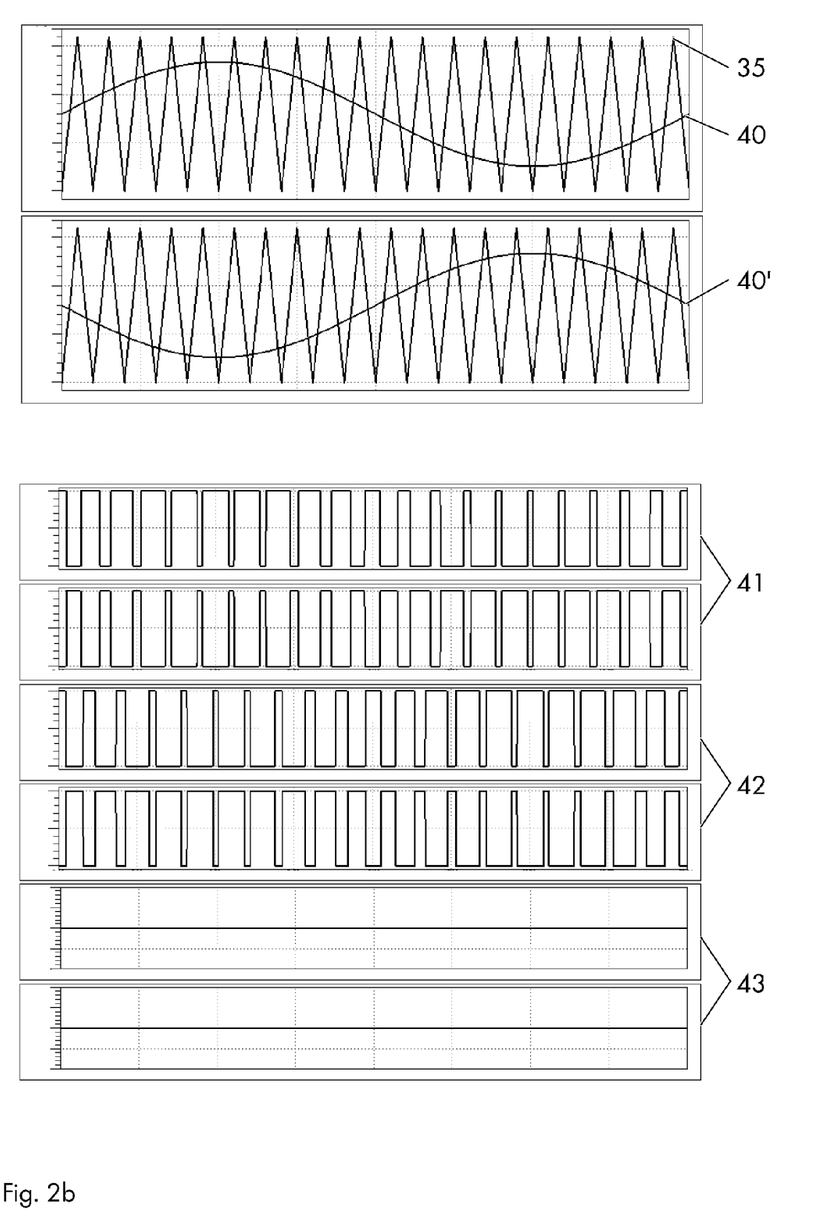

FIG. 2b shows a possible embodiment of a clocking method for actuating the switches of the inverter 1 during emergency operation. Once the local grid 29 has been disconnected from the grid 10, there is a change to a single-phase clocking method. The two graphs at the top are assigned to the two phase outputs 7, 8 at which the single-phase grid is intended to be established. In this case a first reference signal 40, a second reference signal 40' and the carrier signal 35 represent the respective input variables for the controller 12. The controller 12 calculates the PWM signals 41 for the switches of the bridge branch 4 from the first reference signal 40 and the carrier signal 35 and the PWM signals 42 of the bridge branch 5 from the second reference signal 40' and the carrier signal 35. The switches in the bridge branch 6 are not actuated, as indicated at 43. The two reference signals 40, 40' are phase-shifted through 180° with respect to one another.

Figure 3:
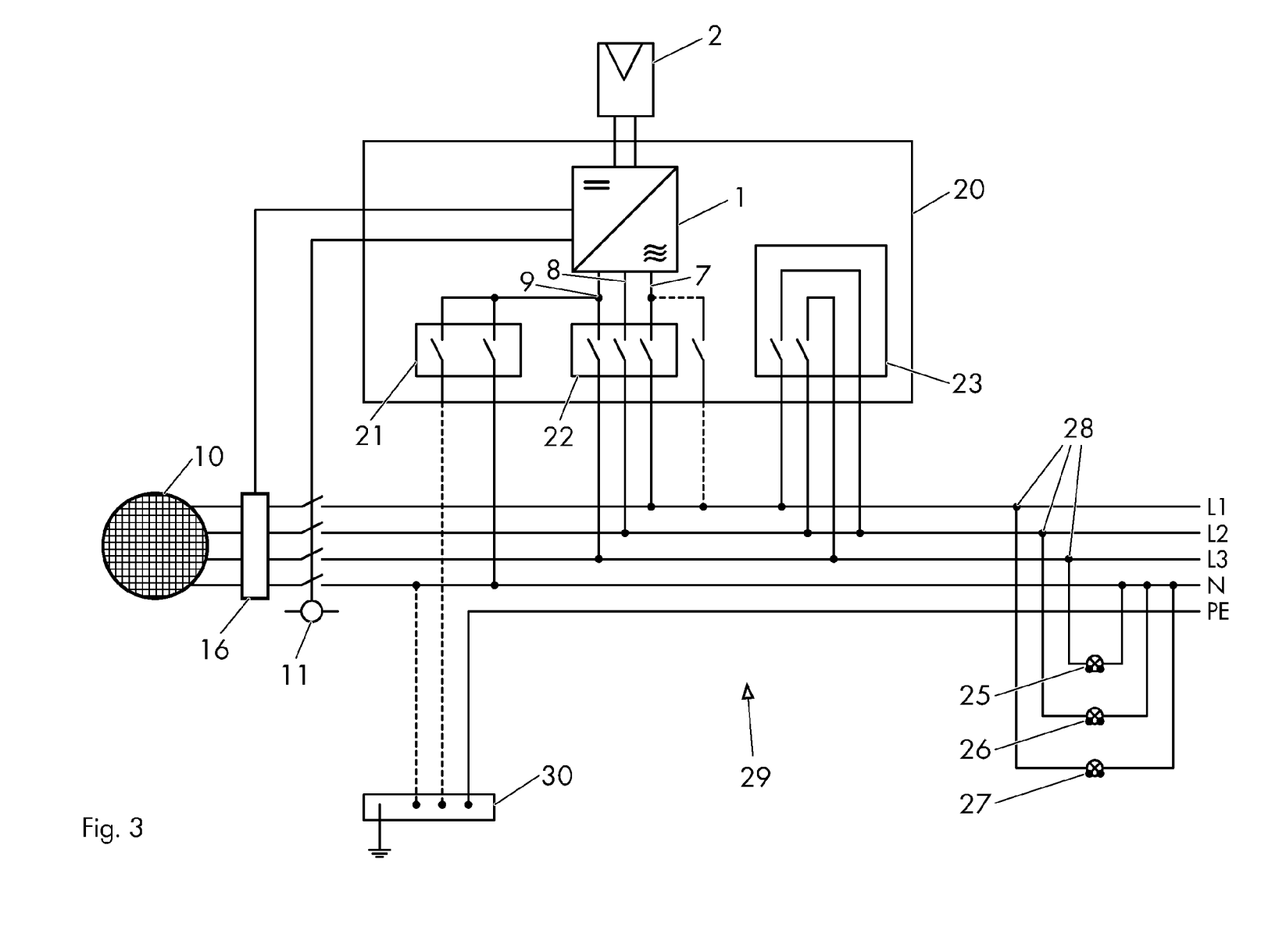
FIG. 3 shows, as a further exemplary embodiment according to the disclosure, an inverter having a device to switchover the feedlines.

FIG. 3 shows, as further example embodiment, an inverter 20 having switching devices 21, 22, 23, which inverter makes it possible to supply energy from a source 2, for example a photovoltaic system located on the house, during emergency operation. The energy is supplied to consumers 25, 26, 27 at their connection points 28 in a local grid 29, for example a socket outlet of a domestic installation. All required switching devices 21, 22, 23 may be accommodated as a structural unit, for example, in the housing of the inverter 20. The switching devices 21, 22, 23 may also be provided as independent components or may be integrated, for example, together with the disconnecting switch 11, in the domestic service box.

During grid-connected operation, i.e. when the disconnecting switch 11 is closed, the three bridge branches 4, 5, 6 of the inverter 1 are clocked in such a way that the DC power of the photovoltaic system 2 is output at the phase outputs 7, 8, 9 as three-phase grid-compliant power. Some of the power may be directly consumed by the consumers 25, 26, 27 in the local grid 29, another fraction of power may be fed into the grid 10. During grid-connected operation, the local grid 29 is also a three-phase grid in which the consumers 25, 26, 27 are distributed among the three phases, in order to achieve a better load distribution.

If the grid monitoring device 16 detects a failure of a fault or the like on the grid 10, the inverter 20 is disconnected from the local grid 29 by means of its inverter switching device 22. The inverter 20 disconnects the local grid 29 with the consumers 25, 26, 27 from the grid 10 at all poles by means of actuation of the disconnecting switch 11 in order to prevent subsequent recovery from the inverter 20 into the grid 10. The local grid 29 now represents a local island grid.

The clocking method is then switched over such that a single-phase grid is provided by operating two of the three bridge branches 4, 5, 6 at the associated two phase outputs 7, 9. The phase output 7 is connected to the phase L1 of the local grid 29 by the inverter switching device 22, and the switches at the phase outputs 8, 9 remain open. The phase output 9 is connected to the neutral conductor N by the neutral conductor switching device 21. For safety reasons, for example in order to ensure the function of an RCD (Residual Current Device), the phase output 9 may also be connected directly to ground, to the PE connection.

In order to be able to supply power to the consumers 25, 26, 27 distributed among three phases in the local grid 29, a coupling switching device 23 may connect L2 and L3 of the local grid 29 to L1. This results in that all consumers 25, 26, 27 are connected to the phase output 7 of the inverter 20 and, via their neutral conductor connection N, to the phase output 9 of the inverter 20. Thus, all of the consumers are connected to the same single-phase voltage of the island grid. It is also conceivable to couple only two of the three phases so that only some of the consumers would be supplied with power during emergency operation.

The grid monitoring device 16 furthermore monitors the state of the grid 10. If a return to the normal state is detected, the inverter 20 is disconnected from the local grid 29 by means of its inverter switching device 22, detaches the connection from phases L2 and L3 to L1 by means of the coupling switching device 23, detaches the connection from the phase output 9 to the neutral conductor N and ground by means of the neutral conductor switching device 21 and connects the local grid 29 to the grid 10 again. The inverter 20 switches over its clocking method back to "normal operation", synchronizes with the grid 10 and provides three-phase grid-compliant power again.

Figure 4:
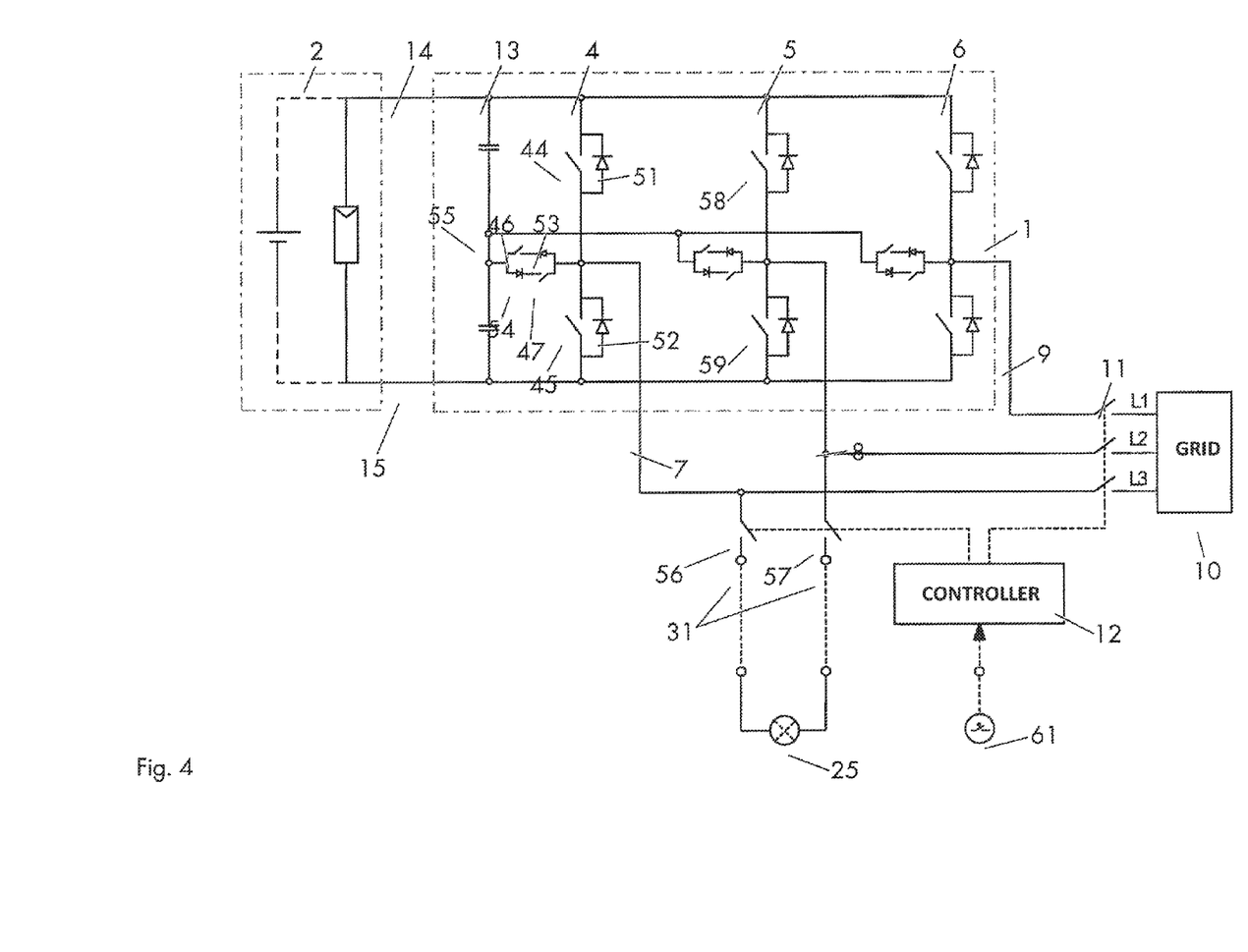
FIG. 4 shows, as further example embodiment according to the disclosure, an inverter with a BSNPC topology.

FIG. 4 shows, as further example embodiment, an inverter 1 having three bridge branches 4, 5, 6, which is suitable for the method according to the disclosure. The DC link 13 acting as a buffer for the DC power is in this case divided, i.e. it comprises at least two series-connected capacitors. The bridge branches 4, 5, 6 each comprise two series-connected bridge switches 44, 45, each having diodes 51, 52 connected antiparallel, wherein the node between the two series-connected bridge switches 44, 45 is connected to the centre point 55 of the divided DC link 13 via two parallel-connected series circuits comprising in each case one center-point switch 46, 47 and a diode 53, 54. This arrangement of the switches is also referred to as BSNPC (Bipolar Switch Neutral Point Clamped) topology and represents a variant of so-called multilevel inverters, specifically "three-level" in this case, which have particularly good conversion efficiency.

During grid-connected operation, i.e. when the disconnecting switch 11 is closed, a three-phase grid-compliant voltage is fed into the grid 10. In this case, both the bridge switches 44, 45 and the centre-point switches 46, 47 are actuated by the controller 12 in a clocking method in order to convert the DC power of the source 2 into a three-phase AC power.

In order to change over to emergency operation, in this embodiment a demand switch 61 is provided. By use of the demand switch 61 a user can indicate that emergency operation is desired and this is signalled to the controller 12. The controller 12 may check whether there is a grid failure. In principle, it is also possible to switchover to emergency operation merely depending on the selection of the user. Prior to switchover, in any case at first the disconnecting switch 11 is opened before the clocking method is changed so that a single-phase grid is provided at the phase outputs 7, 8 by clocking of the bridge switches 44, 45, 58, 59. The phase outputs 7, 8 are connected to another connection point 31 by means of emergency supply switches 56, 57. Apart from the demand switch 61 all switching operations are initiated by the controller 12.

The other connection point 31 may be located, for example, in a separate, mobile housing with a special socket outlet together with the demand switch 61. If the emergency operation function is desired, the user may connect the appliance 25 of his choice to the other connection point 31 and actuate the demand switch 61. Then, the DC power of the source 2, for example of the user's PV system, is used exclusively for supplying power to the selected appliance 25. In order to switch back to grid-connected operation, the demand switch 61 needs to be actuated again, the controller 12 switches the clocking method back to the three-phase clocking method, opens the emergency supply switches 56, 57 and closes the disconnecting switch 11.

If grid feeding is the desired operating method of the system, a check with respect to the state of the grid 10 may be provided prior to emergency operation and the actuation of the demand switch 61 or the function of the emergency supply switches 56, 57 may be blocked if the grid 10 is functioning properly.

The topology of this embodiment is actuated during grid-connected operation in a known three-level clocking method, i.e. the bridge switches 44, 45 and the center-point switches 46, 47 of the respective bridge branches can connect the respective phase output 7 to three different potentials. These potentials are at the DC positive terminal 17, the DC negative terminal 18 and the center point 55 of the divided DC link.

During emergency operation a two-level clocking method is used. Then, there is only clocking between the DC positive terminal 17 and the DC negative terminal 18 by means of the bridge switches 44, 45, and the centre-point switches 46, 47 can remain open. For details in respect of these clocking methods and the switchover of the clocking methods, reference is made to WO 2013/004585 A1 by the applicant, in which this switchover procedure is provided for short-term power supply to capacitors providing energy for drivers of power semiconductor switches.

Similarly, there would be a switchover between grid-connected operation in any other multilevel clocking method in other multilevel topologies and an emergency operation in a two-level clocking method.

The invention claimed is:

1. A method for converting DC power from a source into AC power by means of an inverter (1) comprising three bridge branches, each having a phase output, wherein, during grid-connected operation, the bridge branches are actuated in such a way that the AC power is fed, as three-phase grid-compliant power, into a grid, wherein by operation of two of the three bridge branches, the AC power is provided, as a single-phase island grid, at two of the three phase outputs when the inverter is disconnected from the grid.

2. The method according to claim 1, wherein, during grid-connected operation, the three bridge branches are actuated in a first clocking method, and during island-operation, two of the three bridge branches are actuated in a second clocking method wherein the first and second clocking methods are different.

3. The method according to claim 2, wherein a peak voltage between the two phase outputs at which the single-phase island grid is provided during island-operation is different from the peak voltage between the same two phase outputs during grid-connected operation.

4. The method according to claim 2, wherein the first clocking method is an N-level clocking method, wherein N>2, and the second clocking method is a two-level clocking method.

5. The method according to claim 2, wherein, during island-operation, the provision of the single-phase AC power takes place at the same connection point for consumers as during grid-connected operation.

6. The method according to claim 2, wherein, during island-operation, the two phase outputs for providing the single-phase AC power are connected to a different connection point.

7. The method according to claim 5, wherein, during island-operation, one of the phase outputs is connected to the ground potential.

8. A photovoltaic inverter for converting DC power from a source into AC power, comprising three bridge branches, each having a phase output and a DC link, whose potential is floating with respect to the ground potential, wherein, during grid-connected operation, the bridge branches are actuated in such a way that the AC power is fed, as three-phase grid-compliant power, into a grid, wherein during island-operation, the AC power is provided by two of the three bridge branches as single-phase island grid when the inverter is disconnected from the grid.

9. The inverter according to claim 8, wherein a peak voltage between the two phase outputs at which the single-phase island grid is provided during island-operation is different from the peak voltage between the same two phase outputs during grid-connected operation.

10. The inverter according to claim 8, wherein the bridge branches comprise Neutral Point Clamped (NPC), Bipolar Switch Neutral Point Clamped (BSNPC), Active Neutral Point Clamped (ANPC) or Flying Capacitor (FLC) branches.

11. The inverter according to claim 10, wherein, during island-operation, the AC power is generated by the operation of in each case two switches in each of the two of the three bridge branches at which the single-phase AC power is provided during island-operation.

12. The inverter according to claim 8, further comprising a switching device for producing a connection between the two of the three bridge branches at which the single-phase AC power is provided during island-operation and a connection point for consumers, wherein the connection point is the same as during grid-connected operation.

13. The inverter according to claim 8, further comprising emergency supply switches for producing a connection between the two of the three bridge branches at which the single-phase AC power is provided during island-operation and another connection point for consumers, wherein the other connection point is disconnected from the rest of the local grid during grid-connected operation.

* * * * *